March 20, 1951  H. PUTERBAUGH  2,546,110
AUTOMATIC CALIPER
Filed Nov. 18, 1947  2 Sheets-Sheet 1
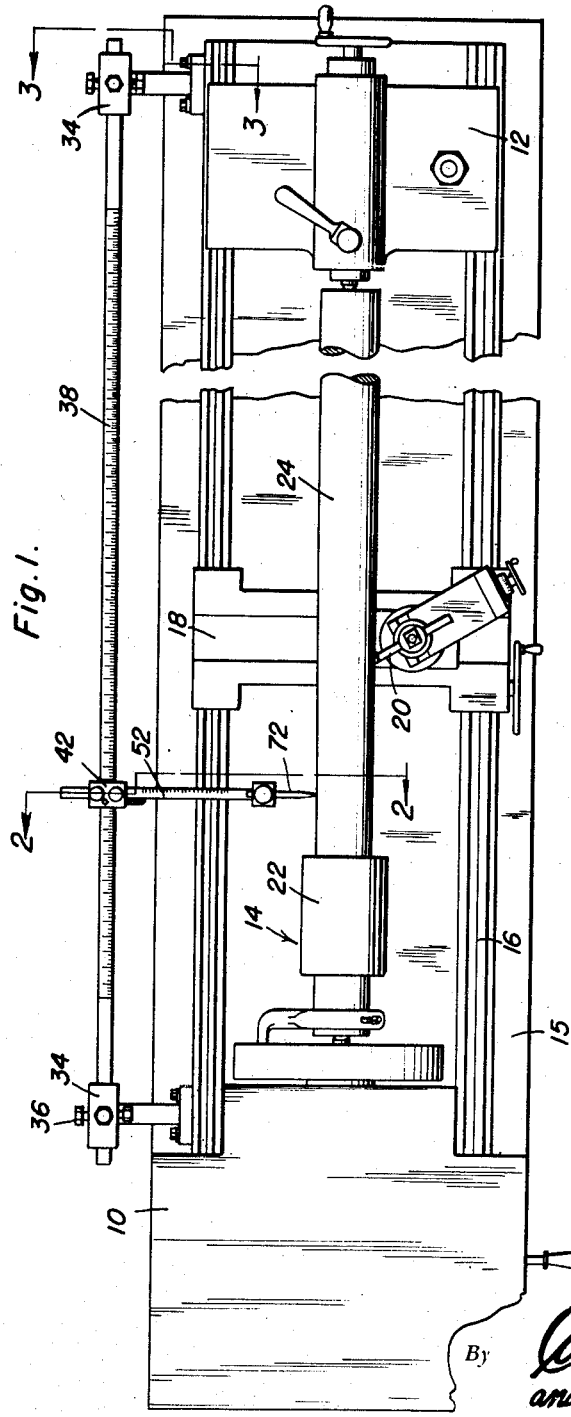
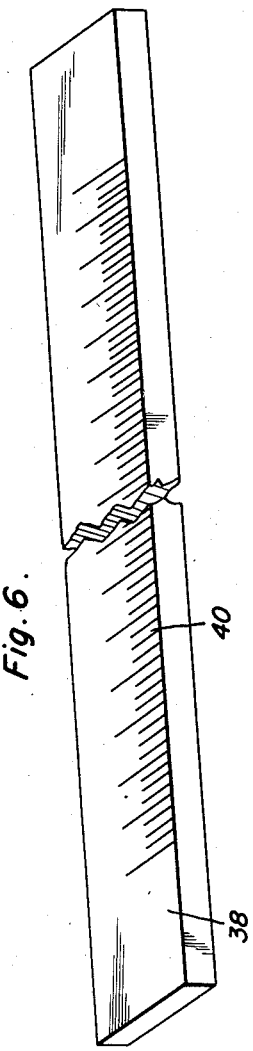
Inventor
Harvey Puterbaugh
By *Clarence A. O'Brien and Harvey B. Jacobson*
Attorneys March 20, 1951 H. PUTERBAUGH 2,546,110
AUTOMATIC CALIPER
Filed Nov. 18, 1947 2 Sheets-Sheet 2
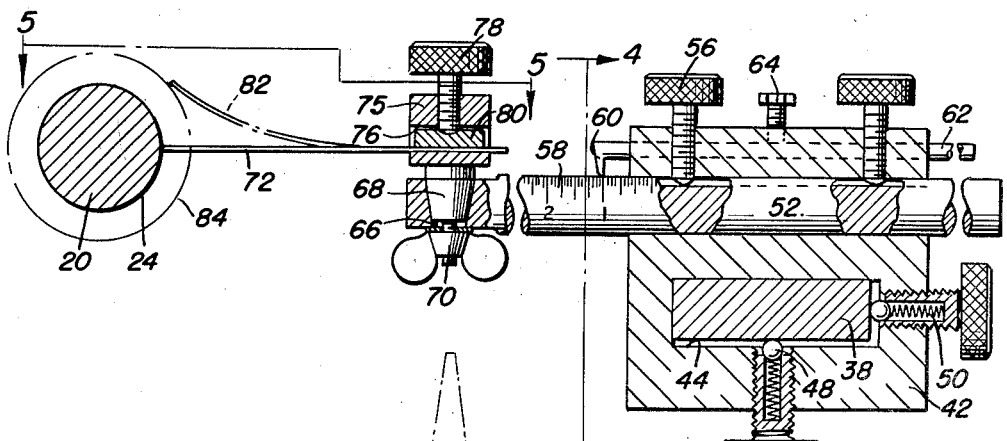
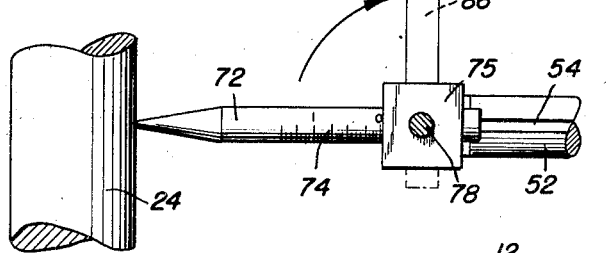
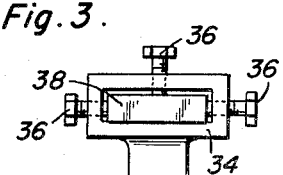
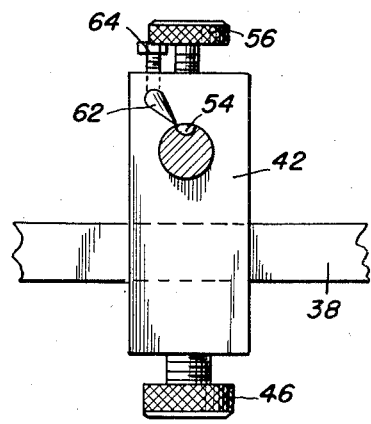
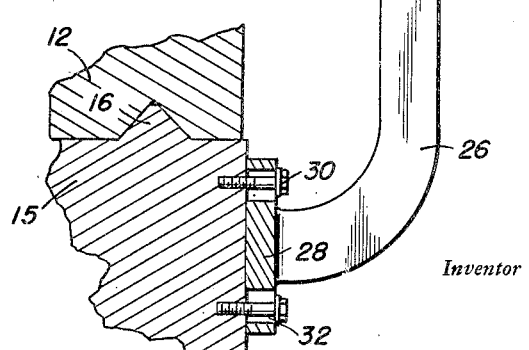
Inventor
Harvey Puterbaugh
By Clarence A. O'Brien
and Harvey B. Jacobson
Attorneys Patented Mar. 20, 1951

2,546,110

UNITED STATES PATENT OFFICE 2,546,110

AUTOMATIC CALIPER

Harvey Puterbaugh, Kokomo, Ind.

Application November 18, 1947, Serial No. 786,704

3 Claims. (Cl. 33—169)

1

This invention comprises novel and useful improvements in an automatic caliper and more specifically pertains to a caliper gauge attachment for use with conventional types of lathes and similar machines.

The primary object of this invention resides in providing a gauge device which may be readily attached to conventional forms of lathes and similar machines; and which may be readily adjusted and set for quickly indicating the attainment of a predetermined rough diameter of an article being turned by the lathe or device.

An important feature of the invention resides in an improved construction of automatic caliper gauge which may be readily applied to existing types of lathes, and which may be easily adjusted to quickly indicate the attainment of a predetermined rough diameter upon an article being worked by the lathe.

A further feature of the invention consists in providing an attachment as set forth in the preceding paragraphs, which may be readily adjusted throughout the length of the lathe in order to take a measurement at any point along the article being worked thereon.

Yet another important feature of the invention includes the provision of a novel supporting carriage which may be readily attached and adjustably mounted upon a lathe bed, for slidably supporting the carriage of the gauge attachment.

These, together with various ancillary objects of the invention which will later become apparent as the following description proceeds, are attained by this device, a preferred embodiment of which has been illustrated, by way of example only in the accompanying drawings, wherein—

Figure 1 is a top plan view, parts being broken away, of a lathe showing the invention applied thereto;

Figure 2 is a vertical transverse fragmentary detail view, taken substantially upon the plane of section line 2—2 of Figure 1, alternative positions of the gauge device being indicated by dotted lines therein;

Figure 3 is a fragmentary combined elevational and sectional view taken substantially upon the plane of the section line 3—3 of Figure 1 and showing the supporting brackets of the device;

Figure 4 is a fragmentary vertical sectional detail view taken substantially upon the plane of the section line 4—4 of Figure 2;

Figure 5 is a further fragmentary detail view taken in horizontal section substantially upon the plane of the broken section line 5—5 of Figure 2; and.

2

Figure 6 is a broken perspective view of the guide for the gauge carriage, forming a part of the invention.

Referring now more specifically to the accompanying drawings, wherein like numerals designate similar parts throughout the various views, attention is directed first to Figure 1 wherein a conventional form of lathe or similar article working and turning machine is illustrated, the same including a head stock 10 and a tail stock 12, and which are shown as rotatably mounting an article such as a shaft 14 to be turned thereby for working upon the same. The tail stock 12 is illustrated as riding upon a pair of lathe ways 16, carried by the bed portion 15 of the lathe.

Indicated at 18, is a conventional form of tool holder, upon which is adjustably mounted a tool 20 of any suitable type. The article 14 is indicated as having an original diameter 22 throughout a part all of its length, which diameter is to be turned down to a rough work diameter 24. As will be well understood, when the rough diameter is attained, various finishing operations may be performed upon the article. Heretofore, when the rough diameter as indicated at 24 has been cut, the work customarily is measured by hand calipers for gauging the work throughout various parts of its length in order to ascertain that the roughing diameter operation has been completed.

In accordance with this invention, an attachment is provided which may be quickly installed upon a lathe, easily manipulated when so installed and which shall be effectively adjustable to various predetermined initial diameters of work, for indicating the attainment of a predetermined rough diameter thereon.

As will be seen by particular reference to Figure 3, this attachment includes a pair of supporting brackets 26 arising from a flanged supporting base or end 28, which latter portion is provided with means for removably attaching the bracket to the bed of the lathe. This means includes fastening bolts such as indicated at 30, which are received in elongated holes or apertures 32 in the base plate 28, whereby the brackets may be adjustably mounted upon the lathe bed and readily adjusted thereon as desired. This adjustment is for the purpose of properly positioning the bracket to various makes and sizes of lathes, with which the attachment is to be associated.

At its upper end, each bracket is provided with a generally rectangular, hollow yoke or frame member 34, whose top and side portions are provided with adjusting screws 36 threaded therethrough, for engaging and adjustably positioning a guide way 38.

As will be seen more clearly by reference to Figures 2, 3 and 6, this guide way 38 consists of a generally rectangular cross sectioned strip 38 provided with suitable scales or indicia 40 for facilitating the travel and attainment of the proper position thereon of a carriage consisting of a body member 42, which is adapted as set forth hereinafter to carry or position the gauging member of the device. As will be seen by better reference to Figure 2, the block or body portion 42 is provided with a transversely extending slot 44 of a sufficient size and shape to loosely accommodate the guide way 38, the bottom wall and one side wall of the body 42 being provided with adjusting screws 46 threaded therein, which adjusting screws carry anti-friction rollers 48 which are urged by springs 50 retained within recesses within the screws into position to abut and slide along the guide way 38. Thus, the block 42 may be readily shifted along the guide, and all slack or clearances are taken up by the tensioning of the screws and spring pressed balls against the bottom and one side of the guide way 38.

As shown more clearly in Figure 2, the body 42 is provided with a transversely disposed slot or bore which is perpendicular to the bore 44, and which is disposed transverse to the bed and ways of the lathe, and also transverse to the longitudinal axis of the work article 14 journaled in the lathe centers. As shown best in Figure 4, this bore is preferably circular in cross section and slidably receives therein a rod 52, which is also circular in cross section and which rod is adjustably retained in adjusted position in the body 42, by means of adjusting screws 56 threaded through the top surfaces of the body and which extend to a longitudinal groove or key way 54 disposed in the rod member 52. As shown, this rod is provided with a suitable scale or other indicia 58, whereby adjustments of the rod with respect to the supporting carriage 42 may be readily obtained. To facilitate this adjustment, a pointer or finger 60 extending laterally from an adjusting rod 62 which is disposed parallel to the rod 52, is positioned in close proximity to the indicia on the scale 58, for a purpose which will be later set forth. This indicator rod 62 is likewise received in a parallel bore in the body 42 with respect to the bore receiving the rod 52, and is adjustably retained therein as by a set screw 64 extending into said bore and engaging the adjusting indicator rod 62.

At the outer end of the rod 52, there is provided a conical tapered bore 66 disposed in a vertical plane therethrough and which bore receives a correspondingly tapered end 68, whose screw threaded lower extremity is engaged by a wing nut 70 for locking the member 68 in the bore 66 of the rod 52. As will be seen, by lifting the wing nut, the member 68 may be turned in said bore for positioning the upper portion thereof in predetermined angular positions with respect to the supporting rod 52.

A gauge member 72, shown more particularly in Figures 2 and 5, and preferably constructed of a resilient material such as spring steel, in the form of a strip having a tapered nose, is provided with suitable indicia 74 and is slidably received in an elongated slot 76 passing transversely through the body portion 75 carried by the above mentioned tapered conical lower end 68. An adjusting or retaining screw 78 extends through the upper portion 75, into the slot 76, and is provided with a foot plate or abutment plate 80 which is pressed downwardly upon the gauge member 72 by proper adjustment of the knurled portion 78. It will thus be seen that the gauge member 72 may be properly adjusted inwardly of the body portion 75, to extend to any desired predetermined distance therefrom. As indicated in the dotted lines showing at 82 in Figure 2, the flexible gauge member is intended to be bent upwardly in order to position the same upon the external diameter indicated by the circle 84, of the unworked portion 22 of the article 14.

As will be readily seen by the dotted lines showing at 86 in Figure 5, the gauge 72, and the body portion 75 within which the same is mounted, may be pivoted about the vertical axis of the member 68 in order to position the same at various angular inclinations with respect to the longitudinal axis of the body 52.

Preferably, the longitudinal axis of the body member of a rod 52 is so positioned as to be slightly below the longitudinal axis of the article 14, whereby the longitudinal axis of the gauge 72 may be positioned upon a horizontal diameter through the article 14 as indicated in Figure 2. By means of this arrangement, the rod 52 may be adjusted to extend the gauge 72 to any desired distance from the carriage 42, and to any desired juxtaposition to the article 14. When so positioned, and this positioning may be facilitated by use of the pointer 60, and the indicia 58 on the rod 52, the gauge 72 may then be given its final adjustment for extension outwardly from the rod 52, into such position that its outer extremity will be positioned to barely contact in proper gauging manner upon the finished roughing diameter 24 of the article, as indicated in full lines in Figure 2. With the gauge so adjusted, as to position, the resilient gauge member 72 is bent upwardly to a dotted line position of 82, and as this outer diameter is gradually worked down to approximate the finished diameter of the portion 24, the flexed member 82 gradually approaches the full line position 72, attaining this position when the work has attained the desired final roughing diameter.

As will readily be seen, the gauge is positioned to move readily along the supporting guide way 38, in order to present the gauge to any desired portion of the article 14 throughout the course of its working. Obviously, the horizontal pivoting of the gauge 72 as shown in Figure 5, will facilitate the positioning of the gauge upon the work for the gauging operation, and the removing of the gauge therefrom as desired.

It will also be seen, that in some instances by means of this horizontal pivoting movement, the gauge may be employed as a gauge in an angular inclined rather than a longitudinally extended position with respect to the rod 52.

From the foregoing, the manner of constructing and operating the device will be readily understood and its many advantages will be obvious. Accordingly, further explanation is believed to be unnecessary and since numerous modifications and equivalents will readily occur to those skilled in the art after a consideration of the foregoing specification and accompanying drawings, it is not intended to limit the invention to the exact construction shown and described, but all suitable modifications and equivalents may be resorted to falling within the scope of the appended claims.

Having described the invention, what is claimed as new is:

1. In a lathe having a head and tail stock for rotatably supporting a working article therebetween, a caliper gauge comprising a body carried by said lathe, a gauge holder carried by said body, a flexible gauge carried by said holder and adjustable therein transversely of a line connecting the centers of the head and tail stock, said gauge having a tapered work engaging end movable to rest tangentially upon the surface of a work article mounted in said lathe before a finished cut has been made thereon and movable to radially engage the surface of a work article after a finished cut has been made thereon, and a graduated guideway slidably supporting the body member, said body member having a flat substantially vertical surface registrable with selected graduations on said guideway, said gauge holder being slidably adjustable in said body, said body including a pointer slidable therein parallel to said gauge holder and a scale on said gauge holder for cooperation with said pointer.

2. In a lathe having a head and tail stock for rotatably holding a work article therebetween, a caliper gauge comprising a plurality of supporting brackets detachably mounted on the lathe bed and having upstanding portions, frame members carried by said brackets, a graduated guideway detachably mounted on said frame members, a body member slidably received on said guideway and having a means for retaining the same longitudinally adjusted on said guideway, said body member having a substantially horizontal opening therein disposed transversely of said guideway, a holder slidably received in said opening and having a scale thereon, a pointer adjustably mounted on said body member for registering with said scale, and a resilient bearing finger hingedly carried by said holder for horizontal swinging movement and bearing against the work article, said finger being distorted against the work article until the work article has been cut to a predetermined diameter.

3. In a lathe having a head and tail stock for rotatably holding a work article therebetween, a caliper gauge comprising a plurality of supporting brackets detachably mounted on the lathe bed and having upstanding portions, frame members carried by said brackets, a graduated guideway detachably mounted on said frame members, a body member slidably received on said guideway and having a means for retaining the same longitudinally adjusted on said guideway, said body member having a substantially horizontal opening therein disposed transversely of said guideway, a holder slidably received in said opening and having a scale thereon, means adjustably carried by said body member for retaining the holder in a longitudinally adjusted position, a support rising from said holder, a resilient finger carried by said support and adapted to be disposed in a substantially horizontal position after the work article has been cut a predetermined amount, said finger resting tangentially upon the surface of the work article before a finished cut has been made thereon and being distorted, and a pointer adjustably carried by said body member for cooperating with said scale.

HARVEY PUTERBAUGH.

REFERENCES CITED

The following references are of record in the file of this patent:

UNITED STATES PATENTS

| Number | Name | Date |
| --- | --- | --- |
| 889,999 | Wilcox | June 9, 1908 |
| 1,265,423 | Burnett | May 7, 1918 |
| 1,317,227 | Scusa | Sept. 30, 1919 |
| 1,484,691 | Wasson | Feb. 26, 1924 |
| 1,514,452 | Frederickson et al. | Nov. 4, 1924 |
| 1,576,453 | Nordstrom | Mar. 9, 1926 |
| 1,765,624 | Scusa | June 24, 1930 |
| 2,414,285 | Bloomingburg | Jan. 14, 1947 |

FOREIGN PATENTS

| Number | Country | Date |
| --- | --- | --- |
| 233,641 | Great Britain | May 14, 1925 |
| 457,372 | Germany | Mar. 14, 1928 |